(12) United States Patent
Eriksson et al.

(10) Patent No.: US 7,896,031 B2
(45) Date of Patent: Mar. 1, 2011

(54) FLUID TRANSPORT IN MONOLITHIC STRUCTURES

(75) Inventors: Mark L. Eriksson, St. Cloud, MN (US); Dennis Rex, Sunnyvale, CA (US)

(73) Assignee: Talon Innovations, Sauk Rapids, MN (US)

( * ) Notice: Subject to any disclaimer, the term of this patent is extended or adjusted under 35 U.S.C. 154(b) by 0 days.

(21) Appl. No.: 12/848,497

(22) Filed: Aug. 2, 2010

(65) Prior Publication Data

US 2010/0313984 A1 Dec. 16, 2010

Related U.S. Application Data

(63) Continuation of application No. 11/713,293, filed on Mar. 2, 2007, now Pat. No. 7,789,107.

(60) Provisional application No. 60/859,423, filed on Nov. 16, 2006.

(51) Int. Cl.
*F16K 27/00* (2006.01)
(52) U.S. Cl. ...................................................... 137/884
(58) Field of Classification Search .................. 137/269, 137/270, 271, 597, 884
See application file for complete search history.

(56) References Cited

U.S. PATENT DOCUMENTS

| 5,836,355 | A  | 11/1998 | Markulec et al. |
| 6,629,546 | B2 | 10/2003 | Eidsmore et al. |
| 6,640,835 | B1 | 11/2003 | Rohrberg et al. |
| 6,874,538 | B2 | 4/2005  | Bennett |
| 6,951,226 | B2 | 10/2005 | Eriksson et al. |
| 7,048,008 | B2 | 5/2006  | Milburn |
| 7,258,139 | B2 | 8/2007  | Perusek et al. |

FOREIGN PATENT DOCUMENTS

| EP | 0877170 | 11/1998 |
| EP | 1471296 | 10/2004 |

OTHER PUBLICATIONS

International Search Report and Written Opinion of the International Searching Authority for International Application No. JPCT/US2007/023640 completed on Aug. 15, 2008 and mailed on Aug. 21, 2008.

*Primary Examiner*—John Fox
(74) *Attorney, Agent, or Firm*—McDonnell Boehnen Hulbert & Berghoff LLP

(57) ABSTRACT

A modular insert and monolithic structure is disclosed where the inserts are embedded in a slot in the monolithic structure to allow MSM components to be mounted directly to the planar surface of the monolithic structure.

5 Claims, 4 Drawing Sheets

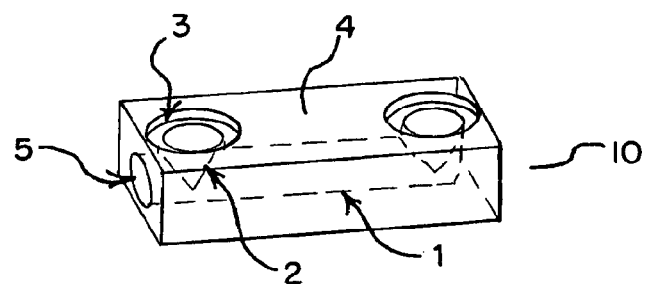
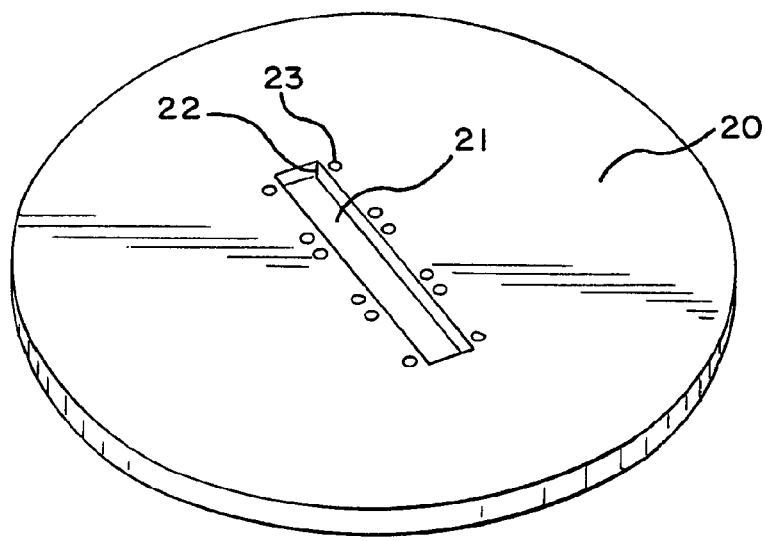
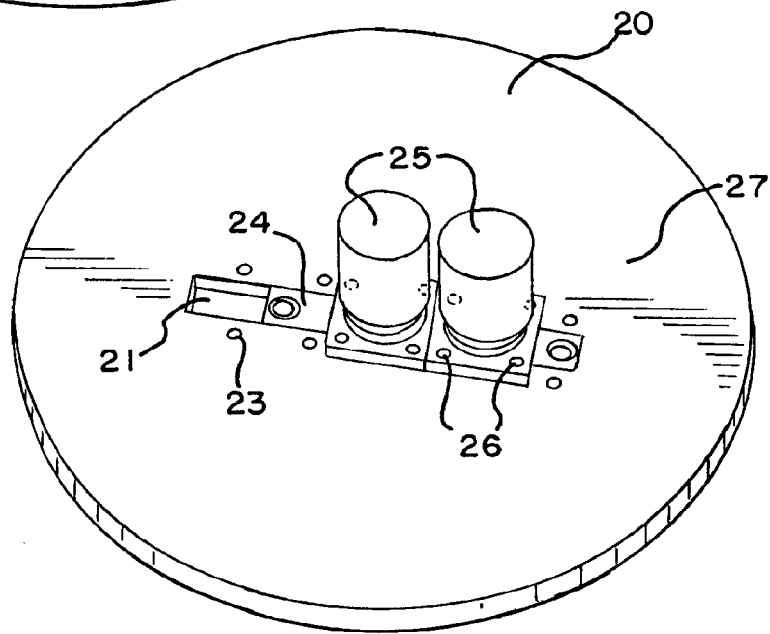

FLUID TRANSPORT IN MONOLITHIC STRUCTURES

CROSS REFERENCE TO RELATED APPLICATIONS

This application is a continuation of U.S. patent application Ser. No. 11/713,293 filed on Mar. 2, 2007, which claims priority to U.S. Provisional Patent Application No. 60/859,423, filed on Nov. 16, 2006, the entire contents of which are incorporated herein by reference.

FIELD OF THE INVENTION

The present invention relates to the field of fluid handling devices generally, and specifically to a system and assembly for allowing process fluid flow between a monolithic structure and modular surface mounted ("MSM") fluidic components used in the semiconductor industry.

BACKGROUND

The term "monolithic structure" refers to mechanical elements that are inherently part of structures that receive process fluids. Typically, these monolith structures are unitary in design and can take the form of lids for fluid receiving chambers, such as chemical canisters (also known as chemical ampoules), semiconductor wafer processing chamber lids, single-gas and multiple-gas manifolds, and other pressure/vacuum chambers. Fluid communication into, and out of, these process fluid receiving chambers, as well as the control of the fluid, has been for many years managed by discrete fluidic assemblies typically consisting of valves, regulators, pressure transducers, and mass flow controllers, interconnected by reusable seals employing metal or elastomer gaskets and/or welding of tubular interconnects. In turn, these fluidic assemblies have communicated with the points of fluid use, or points of fluid origin, such as chemical canisters, wafer processing chambers, and gas manifolds, through reusable seals and/or welded attachments.

FIG. 1 show an example of a prior art external fluidic assemblies connected to a chemical canister. Typically, the primary inlet and outlet control valves are directly welded to the canister. In other prior art configurations, additional valves, and other components such as pressure transducers, may be part of the complex fluidic control arrangement permanently attached to the chemical canister. Several problems are caused as a result of these configurations. The valves, due to wear, contamination, or malfunction, can require replacement, the execution of which may be difficult, expensive, or simply impractical due to the permanent nature of the weld joints. Further, the use of weld-type valves and other tubulated fluidic components significantly increases the overall space required for installation and use of the canister. Further still, the volume and surface area of the externally connected components represent increased volume that must be evacuated or purged clean prior to filling of the canister or use of the contents following installation at the point of use. Further, and not insignificantly, the welded valves and associated fluidic components are all too often used as handling and carrying features, a practice that can lead to weakening and failure of the welded joints between the components and at the canister joints.

The advent of modular surface mount ("MSM") fluidic components, beginning in the mid-nineteen nineties, is perceived as a significant milestone in reducing the size of fluidic systems. That is, systems comprised of fluid control and measurement components such as valves, regulators, filters, pressure transducers, mass flow meters, and mass flow controllers. Prior to MSM interfaces, such components were typically joined for fluid communication by interconnecting tabulations either via welding or via reusable gasketed connections. Either method was enabled by metal tubing protrusions, or appendages, intrinsic to each fluidic component for the express purposes of interconnection and fluid transport.

MSM interfaces did reduce the size, or "footprint," of fluidic systems considerably. In MSM architecture, the fluidic component is sealed, typically with elastomer O-rings or metal gaskets, using bolts for compression, to a receptive MSM or "modular" architecture. Several MSM or modular architectures that are in common use are described in U.S. Pat. Nos. 5,836,355; 6,951,226; and 7,048,008. A common aspect of these disclosures is twofold: (1) to provide for the standardized fluidic interface to seal to the MSM component and (2) to provide interconnecting gas conduits for the purpose of routing fluids into, out of, and between fluidic components.

The reduction of size and internal "wetted" area and volume afforded by modular fluidic systems are well understood, especially within the semiconductor wafer processing industry wherein size, purity of fluids, cleanliness of the gas system, and serviceability are prized attributes of any fluidic system.

Although MSM-type fluidic systems offer advantages in terms of reduced size, reduced area and volume exposed to the controlled fluids, and improved serviceability, the MSM component typically must be sealed to a receptive modular architecture in the manner disclosed by the aforementioned patents. Put in another way, the MSM fluid component is typically mated to a corresponding modular interface in order to complete the fluidic circuit. Conventionally, this corresponding modular interface is provided by modular architectures of various designs but all of which embody the standard modular interface as set forth by SEMI Standards F86-0304 and F87-0304, among others.

There are, however, some exceptions to the convention of mating MSM fluidic components to standard MSM architectures. For example, it is possible to provide the appropriate mating interface on a non-modular, or monolithic, surface, but this requires a method of fluid communication to, or from, or between, the fluidic components. This may be accomplished by boring interconnecting fluidic passages in the monolithic structure itself, typically a stainless steel alloy. FIG. 2 shows such a configuration, with two MSM components, such as valves, regulators, pressure transducers, or filters, mounted to a monolithic base that has been machined with the sealing and bolt mounting configuration consistent with current MSM interface practice. Sealing of the MSM component directly to the surface of the monolithic structure is accomplished by using appropriate O-rings or metal gaskets. Additionally, interconnecting fluidic paths are machined into the monolithic structure at angles appropriate for the fluidic interconnection, or intercommunication, of the fluidic components. Additional fluidic paths may be machined to allow external fluid communication with the components, and, through them, to the process or use served by the monolithic structure. Referring again to FIG. 2 the process fluid is available at external port, P1, and can flow to or from fluidic component FC1, and from FC1 flow to or from fluidic component FC2, and from fluidic component FC2 to or from the chamber, to which monolithic structure MS1 is affixed, through port P2. The direction of flow through the fluidic circuit being determined by the pressure differentials present between P1 and P2. The monolithic structure, MS1, may be an integral part of a chemical canister used for the supply of chemical, or MS1 may be a structure integral to a vacuum or pressure processing chamber such as a semiconductor wafer processing chamber. Further, MS1 may be integral to yet another fluidic conduit for the purpose of controlling fluid into or out of that conduit.

While the general method for employing MSM components as depicted in FIG. 2 is known to the art, the method has several problems. The first problem is simply the cost of machining angled fluidic passages in materials such as stainless steel, nickel, titanium, Hastelloy, and other metals generally valued, and used, for their corrosion resistance in chemical and vacuum service. In applications involving ultra-high purity chemical delivery and/or ultra-high vacuum, it is desirable to smoothly converge, or blend, the angled fluidic passages where they are joined to produce very smooth surface finishes minimizing molecular entrapment, corrosion sites, and outgassing. These principles are well understood by those skilled in the art of ultra-pure chemical delivery or ultra-high vacuum. The need for near-perfect blending of the angled and convergent fluid paths results in demanding and often very expensive machining operations. A second problem associated with angled fluidic passages is one of reduced conductance. As anyone skilled in the subject of plane geometry may appreciate, a cylinder, when intersecting a plane at an angle, will produce an ellipse at the plane of intersection. And so it is with fluidic passages angled into monolithic structures and the resulting ovality of the cross-section of the passages at the plane of sealing. The standard diameter of fluidic passages in MSM components and corresponding modular architectures is 0.180" diameter, established as such to emulate the inside diameter of commercial ¼" stainless steel tubing that has been used predominantly for decades in liquid chemical and gas transport, and analytic instrumentation.

When a 0.180 diameter fluidic passage is machined into a monolithic structure at an angle of 30 degrees, an angle that may be considered typical in monolithic structure fluid passages, the an oval cross-section results from the intersection of the gas passage with the surface of the monolithic structure. It is on this surface, and coaxial with the fluidic passage, that the sealing feature for the O-ring or metal gasket, necessary to seal the MSM component to the passage, must be provided. The MSM standards for interface seals requires that the fluidic passage be no larger than 0.180" diameter at the risk of compromising the O-ring seal or metal gasket seal. However, the major axis of the ellipse produced by machining the 0.180" diameter gas path at 30 degrees from perpendicular is 0.208" and would result in a compromised MSM seal. Thus, as is the present practice, the diameter of the internal fluidic gas passage must be reduced according to the angle of penetration so as to maintain the major axis of the resulting ellipse within the 0.180" maximum dimensional standard. In practice, it is not uncommon to find gas passages, machined at acute angles, as small as 0.090" diameter to avoid exceeding the 0.180" diameter at the MSM sealing surface. The effect of this practice is dramatically reduced fluid conductance that may compromise the performance of the fluidic system. This is an especially important problem in fluidic systems controlling high viscosity liquids or low vapor pressure gases.

A possible solution to maintaining acceptable elliptical dimensions at the sealing surface for internally machined fluid passages is to manufacture them at angles closer to perpendicular to the sealing surface, and deeper. This is another simple matter of trigonometry wherein the termination of intersecting fluid passages in the lateral direction may be achieved by depth rather than angle. For example, one pair of passages could be constructed at a 30 degree angle from perpendicular while another pair is constructed at 10 degrees from perpendicular. Both solutions are designed to maintain a major elliptical axis of 0.180" at the sealing surface. The result is that fluid passages fabricated at 30 degrees must be 0.156" diameter, and the fluid passages fabricated at 10 degrees must be 0.177" diameter in order to follow the guidelines for MSM sealing surfaces. As important, the fluidic passages fabricated more closely to perpendicular must be considerably deeper to achieve blended convergence. This reveals the basic design tradeoff required when attempting to use MSM components directly on the surface of monolithic structures: a tradeoff between conductances of the fluidic passages versus the depth required for their fabrication. In all cases, as explained earlier, the complexity and cost of machining angled interconnecting fluidic passages in monolithic structures is not inconsiderable. Further complicating this matrix of design decisions is the reality that few monolithic structures have sufficient thickness to permit near-perpendicular angles for the interconnecting fluidic passages and the resulting depths of the fluidic passages. Therefore it has become customary to sacrifice fluid conductance by decreasing the diameters of the fluidic passages and fabricating the passages at angles typically between 30 degrees and 45 degrees.

What is needed is a system for the direct implementation of MSM components on the surfaces of monolithic structures that allows maximum conductance consistent with the diameters of the fluidic passages of the components themselves. Further, this method must minimize the depth of required penetrations into the monolithic structures and eliminate the need and expense of fabricating angled fluidic passages. My invention addresses the various difficulties associated with the use of angled fluidic passages integral to monolithic structures, as described above, by using a small family of fluidic inserts embedded in a slot formed in the monolithic structure. The use of these inserts requires only the relatively simple machining of slots into the surfaces of monolithic structures for placement of the inserts and the subsequent sealing of the MSM fluidic components to the inserts by the fastening of the components to the surface of the monolithic structure. These and other features of my invention are described below.

SUMMARY

My invention provides a solution to the above-mentioned problems by providing a monolithic structure containing a slot that accepts one or more modular fluid inserts that allow process fluid to flow into or out of a chamber connected directly to the monolithic structure and that allows interface with one or more MSM fluidic components. More particularly, the invention relates to modular fluid insert and monolith system comprising:

a monolith structure having a top planar surface and a bottom surface that is in direct fluid communication with a chamber designed to receive a process fluid, where the top planar surface has a slot and fastener passages and where the slot has a first fluid passage through the bottom surface to allow the process fluid to pass into or out of the chamber; and a modular fluid insert having top and bottom faces, where the insert is of a size and shape that allows the insert to fit into the slot such that the top face does not extend above the top planar surface and where the insert has a second fluid passage in the bottom face that is aligned and connected with the first fluid passage in the bottom surface of the monolith structure.

A further configuration includes a modular fluid block and monolith assembly comprising:
- a monolith structure having a top planar surface and a bottom surface that is in direct fluid communication with a chamber designed to receive a process fluid, where the top planar surface has a slot and fastener passages, and where the slot has a first fluid passage through the bottom surface to allow the process fluid to pass into or out of the chamber;
- at least two modular fluid inserts having top and bottom faces, where the inserts are of a size and shape that allows the inserts to fit into the slot such that the top faces do not extend above the top planar surface, where each insert has an internal passage to allow process fluid to flow into or out of the top face, and where at least one of the inserts has a second fluid passage in the bottom face that is aligned and connected with the first fluid passage in the bottom surface of the monolith structure; and
- at least one MSM component connected directly to at least one insert through a seal and connected directly to the top planar surface of the monolith structure by fasteners connected to the fastener passages.

One skilled in the use of MSM fluidic components will appreciate that the use fluidic inserts embedded into the surface of monolithic fluidic structures represents a significant and novel method for the direct implementation of MSM fluidic components. The use of embedded fluidic inserts requires no fabrication of angled fluidic passages within the body of the monolithic structure, requires much less depth for implementation than do integrally angled fluidic passages, is more cost effective to implement, allows for replacement of the fluidic inserts for repairs or fluidic path reconfiguration, and allows for mounting of the MSM fluidic components directly to the surface of the monolithic structure for the most compact fluidic assembly possible. These and other embodiments are evident from the following more detailed description of my invention.

BRIEF DESCRIPTION OF THE FIGURES

FIG. 3 is a perspective view of an example embodiment of a modular fluidic block insert of the present invention.

FIG. 4 is a perspective view of an example embodiment of the monolithic structure containing a slot to accept the inserts of the present invention.

FIG. 5 is a perspective view of an example embodiment of an assembly of MSM components, modular inserts and the monolithic structure containing a slot to accept the inserts of the present invention.

DETAILED DESCRIPTION

Figure 1:
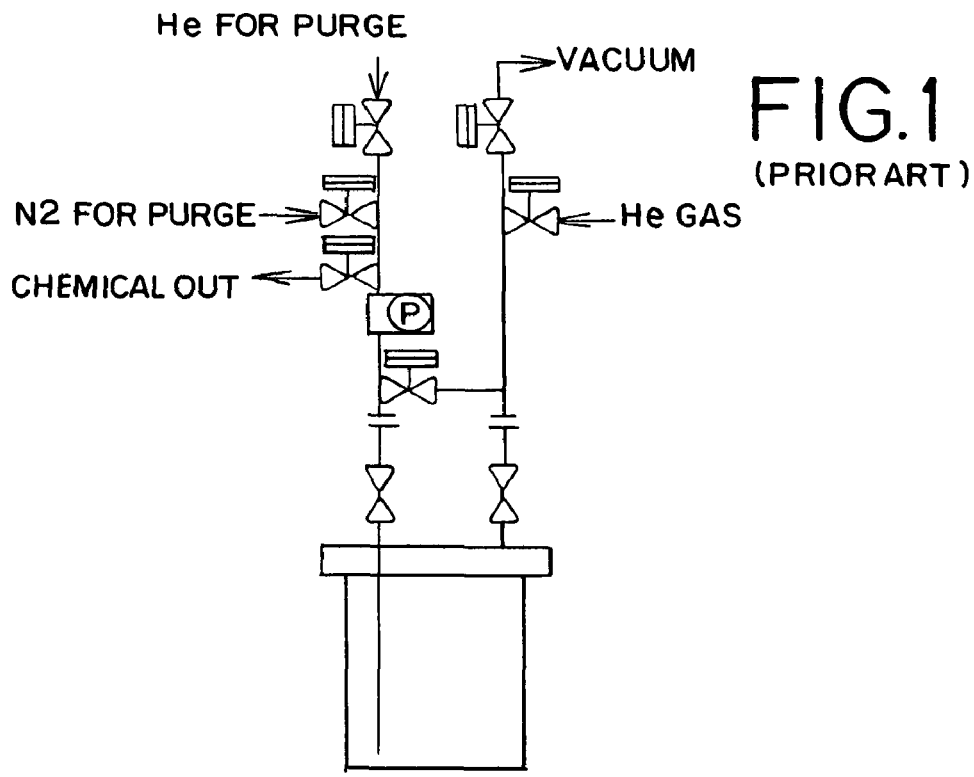
FIG. 1 is a side view of a prior art system.
Figure 2:
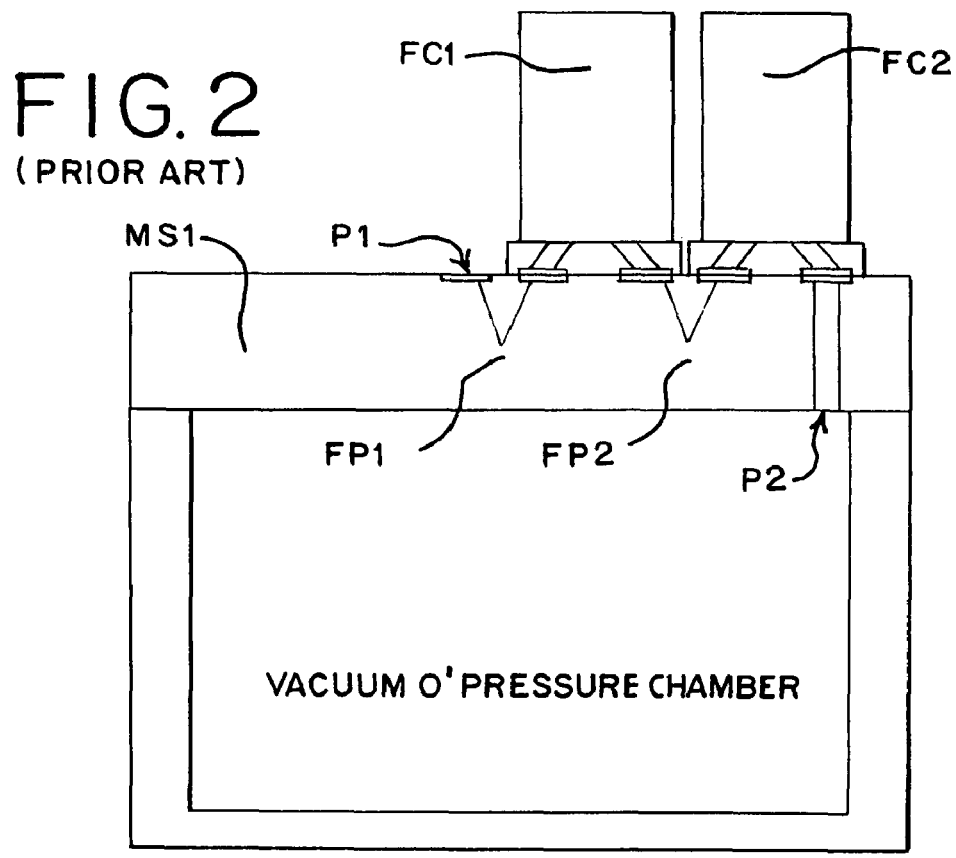
FIG. 2 is a side view of another prior art system.

My invention is useful with all process fluids known to those skilled in the art, including gases and liquids typically used in the fabrication of electronic parts, including semiconductor wafers. The modular inserts of my invention are preferably manufactured using metals that can transport corrosive process fluids. Such metals include those normally used for ultra-high purity chemical and gas delivery, and for ultra-high vacuum environments, including stainless steel of various alloys, Monel®, nickel, cobalt, titanium, Hastelloy®, and combinations thereof.

A substantially square or rectangular shaped modular fluid insert is preferred for use in adapting MSM fluidic components directly to the surface of monolithic structures such as containment structures on chemical canisters and vacuum or pressure vessels, or semiconductor wafer processing chambers, or surfaces integral to larger fluidic conduits. More preferably, the overall dimensions of the insert may be seen to be 1.14" in length, 0.52 inches in width, and 0.30" in height, with all fluidic passages preferably being orthogonal to one another and nominally 0.180" diameter. At least one primary fluidic passage provided along the primary axis of the insert serves to interconnect the two ports associated with sealing to MSM components.

After fabrication of the internal passages, a round cap, or plug, of like material of the insert, is welded to seal the end of the insert, thus effectively forming a U-shaped internal fluidic passage. Those skilled in the art of metal fabrication may appreciate that the insert may be fabricated by traditional machining methods from bulk material, or by powder metallurgy (PM) techniques of various forms such as metal injection molding (MIM), hot powder forging, and hot or cold isostatic pressing, or by injection molding. Subsequent "clean-up" machining operations may be required to achieve acceptable surface finishes depending upon the fabrication method used for the insert body. Metals, bulk or powder, typically used for ultra-high purity chemical and gas delivery, and for ultra-high vacuum environments, include stainless steel of various alloys, Monel®, nickel, cobalt, titanium, and Hastelloy® can be used to form the end cap. FIG. 3 shows one example of an insert 10 with an internal passage 1 and two ports 2 (with sealing surfaces 3) on the top face of the insert 4. End cap 5 seals one end of the internal passage. The inserts can also contain aligning pins (not shown).

Figure 7:
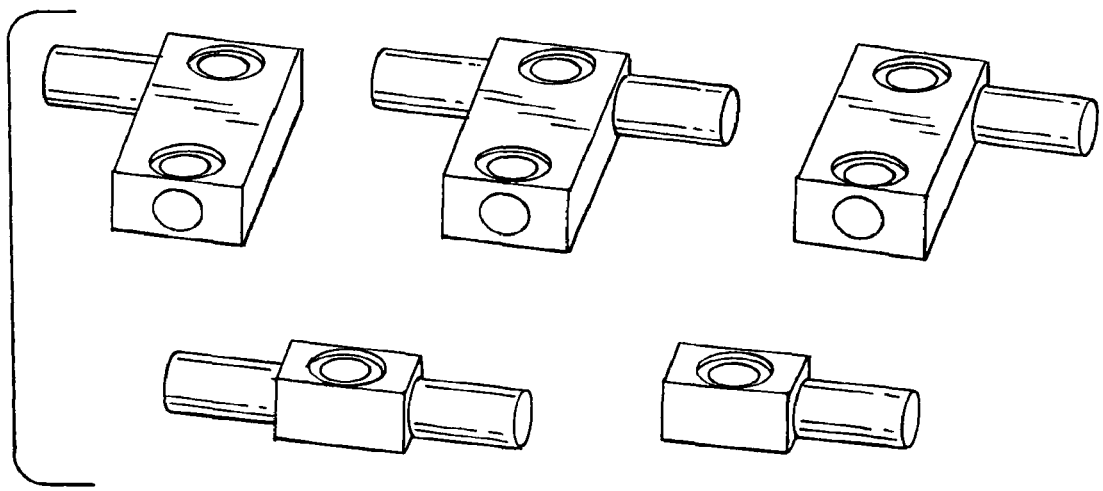
FIG. 7 is a perspective view of examples of fluidic inserts modified to include lateral, or branching, tubulations.
Figure 8:
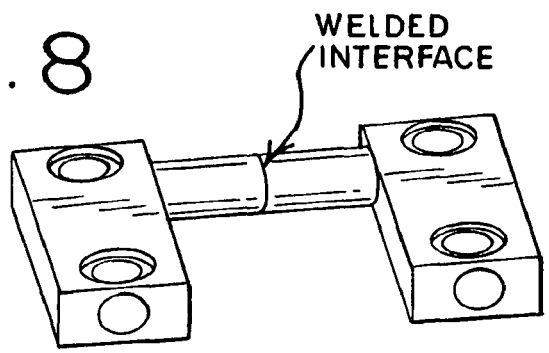
FIG. 8 is a perspective view of one embodiment showing two or more tubulated fluidic inserts joined by welding to form a hermetic path for fluid communication between inserts.
Figure 9:
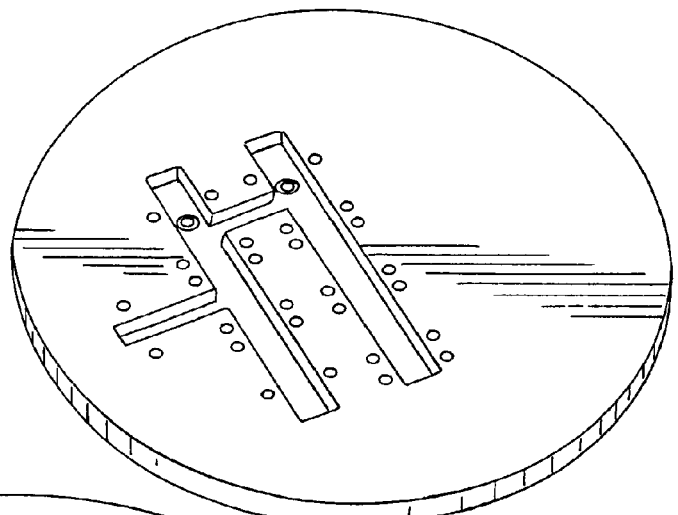
FIG. 9 is a perspective view of a monolithic structure prepared to receive lateral branching tubulated fluidic inserts.
Figure 10:
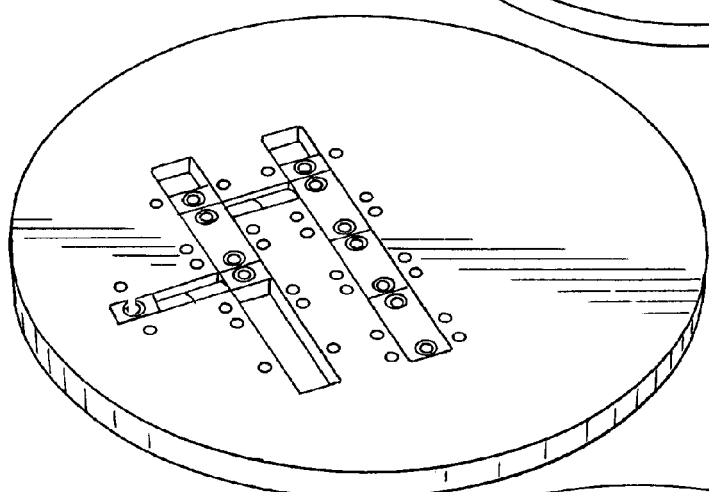
FIG. 10 is a perspective view of a monolithic structure containing standard and welded lateral branching tubulated fluidic inserts.
Figure 11:
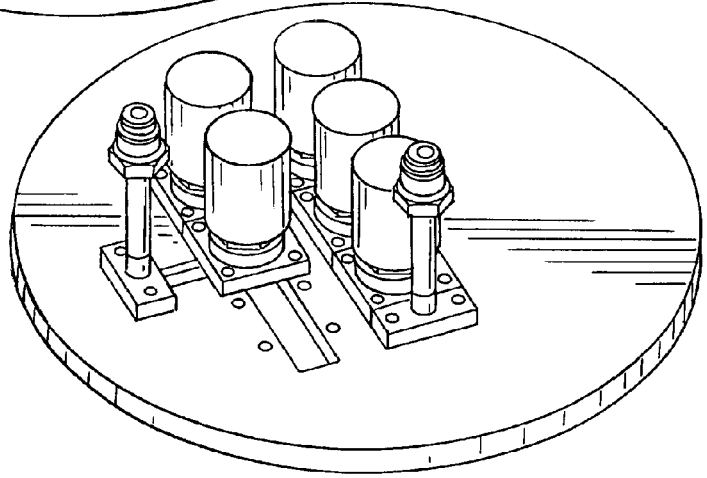
FIG. 11 is a perspective view of a monolithic structure containing standard and welded lateral branching tubulated fluidic inserts with attached MSM components in position.

It may be further appreciated that, in practice, the present invention is not limited to single linear assemblies. Modification of appropriate fluidic inserts to include lateral tubulations allows for an additional dimension of construction within a monolithic structure. FIG. 7 shows a representative family of fluidic inserts that include lateral tubulations. These tubulations are in fluid communication with the internal fluid passages of the inserts. Two or more tubulated inserts may be hermetically joined by welding, typically automated orbital welding as is customary in the fabrication of fluid control systems, as may be seen in FIG. 8. Correspondingly, the monolithic structure may be prepared to receive the lateral branching inserts as appropriate as may be seen in FIG. 9. The addition of lateral tubulations to the fluidic inserts does not affect their depth. Thus both the linear and transverse, or branching, slots machined into the monolithic structure may be of constant depth and simply configured as appropriate to accommodate the desired arrangement of fluidic inserts. The arrangement of inserts, of course, is driven by the desired fluidic circuit and the corresponding selection and arrangement of components, such as valves, regulators, transducers, and filters, to accomplish that circuit. FIGS. 10 and 11 show one example of the placement of standard and lateral branching fluidic inserts into a monolithic structure, with and without the MSM components. These embodiments encompass three axes of fluid transport: the planar surface of the monolithic structure representing the X and Y axes, and the fluid input/output to the fluidic connectors, and fluid communication through the monolithic structure itself, the Z axis. Thus very efficient spatial use of the monolithic structure surface and complex fluidic circuits may be affected with the employment of the embedded fluidic inserts described herein.

FIG. 4 illustrates one example of a monolithic structure containing a slot for preparation of the monolithic structure to receive the fluidic inserts of the present invention. Slot 21 with corner radii 22 is machined into monolithic structure 20. Multiple mounting holes (fastener passages) 23 consistent with MSM component standards are located adjacent the slot in the monolithic structure. These fastener passages preferably are tapped and threaded to accept fasteners that are commonly used with a variety of MSM components. While the shape of the monolithic structure in FIG. 4 is round, the shape is not critical to my invention and can be of any shape and size. Preferably, it need only have a planar surface sufficiently sized to accept MSM components, and a thickness sufficient to accept the fluidic inserts such that they do not protrude above the planar surface of the monolithic structure. Most preferably, the monolithic structure will be approximately ½" thick and the top face of the inserts, once embedded in the slot, will be flush with the planar surface.

FIG. 5 illustrates an assembly of a monolithic structure 20 employing modular fluid inserts 24 of the present invention embedded in slot 21. Inserts 24 are held in place by two MSM fluidic components 25 that are mounted via fasteners 26 engaging fastener passages 23. The bottom surface of the MSM components are mounted directly to planar surface 27 or face of the monolithic structure.

Figure 6:
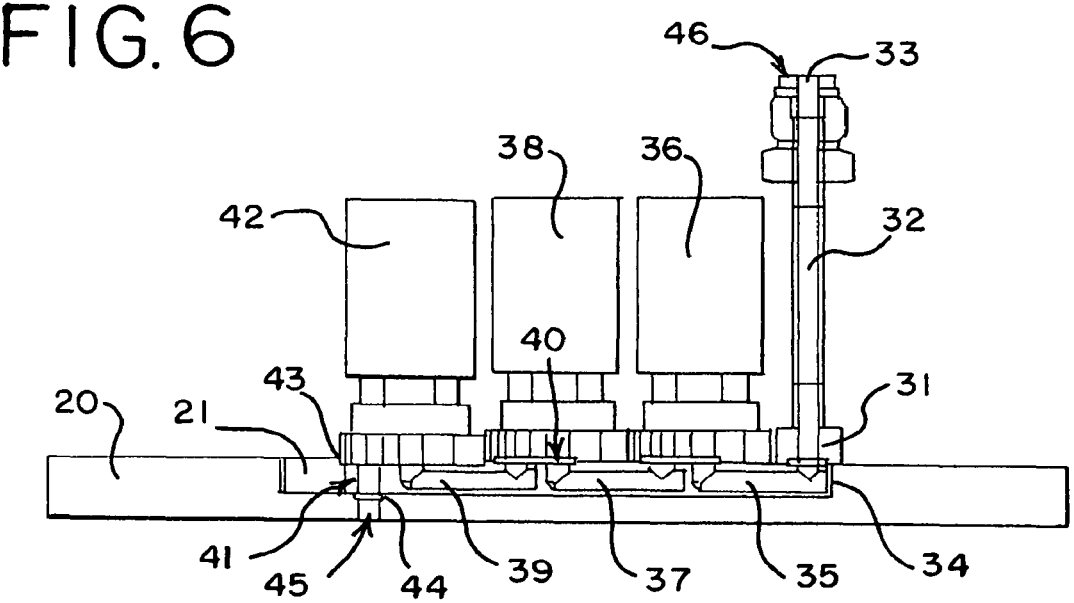
FIG. 6 is a side view of an example embodiment of an assembly of MSM components, modular inserts and the monolithic structure containing a slot to accept the inserts of the present invention.

FIG. 6 illustrates one embodiment of a completed assembly of my invention. An input/output, or I/O, block 31 with welded tubular extension 32 and welded face seal fitting 33 are attached to monolithic structure 20 for fluid communication with one fluid insert 34 having internal passage 35. Fluid insert 34 allows communication with MSM component 36 and through it to fluidic insert 37 to MSM component 38 and through it to fluidic insert 39. I/O block 31 and MSM components 36 and 38 are compressed against fluidic inserts 35, 37, and 39 by bolts engaging threaded holes 23 in monolithic structure 20 to affect hermetic seals 40 at the MSM components-to-fluidic insert interfaces.

Effecting fluid communication through the monolithic structure is accomplished by the fluidic insert 41. Importantly, the modular inserts of my invention are of a width and height that does not exceed the dimensions of slot 21 in the monolithic structure. Insert 41 communicates between an MSM fluidic component 42 directly to the surface of the monolithic structure to which it is inserted. Compression by the bolts securing the MSM component is transmitted through the base of the component to create, with appropriate MSM gaskets, hermetic seals 43 and 44. The mounting bolt holes in the monolithic structure have been suppressed for clarity. A complete fluidic circuit is established between fluid port 45 and insert 41 to MSM component 42 and from MSM component 42 to insert 39 and through insert 39 to MSM component 38 and from MSM component 38 to insert 37 and from insert 37 to MSM component 36 and from MSM component 36 to insert 35, with insert 35 in fluid communication with I/O block 31, tubular extension 32 and fluid port 46 in face seal 33. It is evident to anyone familiar with fluid flow that the direction of flow through the fluidic circuit will be determined by the prevailing pressure difference between ports 45 and 46. The diameters of all fluidic passages in the fluidic inserts are the same as those in the MSM fluidic components. The MSM components are mounted on the planar surface of the monolithic structure, allowing for as compact an assembly as is possible. Excluding fluid port 45, the maximum penetration into the monolithic structure is approximately 0.30 inches. The MSM fluidic components 36, 38, and 42, for example, may be valves, regulators, pressure transducers, filters, and any other fluidic components available with MSM-standard interfaces.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

The invention claimed is:

1. A modular fluid block and monolith assembly comprising:
   a monolith structure having a top planar surface and a bottom surface that is in direct fluid communication with a chamber designed to receive a process fluid, where the top planar surface has two or more slots, at least one lateral branching insert slot connecting two slots, and fastener passages, where each slot has a first fluid passage through the bottom surface to allow the process fluid to pass into or out of the chamber;
   at least two rows of modular fluid inserts having top and bottom faces, one row position in each slot, where the inserts are of a size and shape that allows the rows of inserts to fit into each slot such that the top faces do not extend above the top planar surface, where at least one insert in each row has an internal passage to allow process fluid to flow into or out of the top face, and where at least one of the inserts in each row has a second fluid passage in the bottom face that does not extend below the slot and is aligned and connected with the first fluid passage in the bottom surface of the monolith structure to allow the process fluid to flow directly from the second fluid passage into the first fluid passage in the monolith structure and then directly into or out of the chamber;
   at least one tubulated insert positioned in the lateral branching slot and connected to at least one insert in each slot; and
   at least two MSM component connected directly to at least one insert in each row through a seal and connected directly to the top planar surface of the monolith structure by fasteners connected to the fastener passages.

2. The assembly of claim 1 where the lateral branching slot is extends from each slot at a 90 degree angle.

3. The assembly of claim 1 where none of the internal passages are angled with respect to the top planar surface of the monolith.

4. The assembly of claim 1 where the inserts are fabricated from metals selected from the group consisting of stainless steel of various alloys, Monel®, nickel, cobalt, titanium, Hastelloy®, and mixtures thereof.

5. The assembly of claim 1 where the tubulated insert comprises two tubulated inserts, one in each row that are welded together to form a hermetic seal.

* * * * *